United States Patent [19]

Matysak

[11] 3,774,664
[45] Nov. 27, 1973

[54] APPARATUS FOR INFLATING TUBELESS TIRES

[76] Inventor: Edward A. Matysak, 612 Greengate St., Corona, Calif. 91720

[22] Filed: Nov. 30, 1971

[21] Appl. No.: 203,152

[52] U.S. Cl. .............................................. 157/1.1
[51] Int. Cl. ............................................. B60c 25/12
[58] Field of Search ................................... 157/1.1

[56] References Cited
UNITED STATES PATENTS

| | | | |
|---|---|---|---|
| 2,936,827 | 5/1960 | Riggs | 157/1.1 |
| 3,528,474 | 9/1970 | May | 157/1.1 |
| 3,016,934 | 1/1962 | Smyser | 157/1.1 |
| 3,669,175 | 6/1972 | Sorenson et al. | 157/1.1 |

Primary Examiner—Granville Y. Custer, Jr.
Attorney—Herbert E. Kidder

[57] ABSTRACT

A tubeless tire inflating apparatus comprising an open-top cylindrical chamber having a radial air-sealing flange around its top edge that engages the bottom side wall of a tire, and a piston slidable within said chamber and having a sealing ring that engages the bottom flange of the wheel. Fixed to the underside of the piston at its center and projecting downwardly through a sealing ring in the bottom of the chamber is a tubular sleeve. A cylindrical shaft extends upwardly through the sleeve and through an aperture in the piston, and its bottom end is attached to the actuating rod of an air cylinder. A plate is detachably secured to the top end of the shaft and bears against the top side of the wheel, so that downward movement of the actuating rod causes the wheel and piston to be pulled downwardly, thereby sealing the top bead of the tire against the wheel. Air introduced into the tire through the rim valve fills the tire and leaks past the piston into the chamber, causing the piston to rise until the bottom bead of the tire seats against its flange.

3 Claims, 6 Drawing Figures

PATENTED NOV 27 1973

INVENTOR.
EDWARD A. MATYSAK
BY Herbert E. Kidder
AGENT

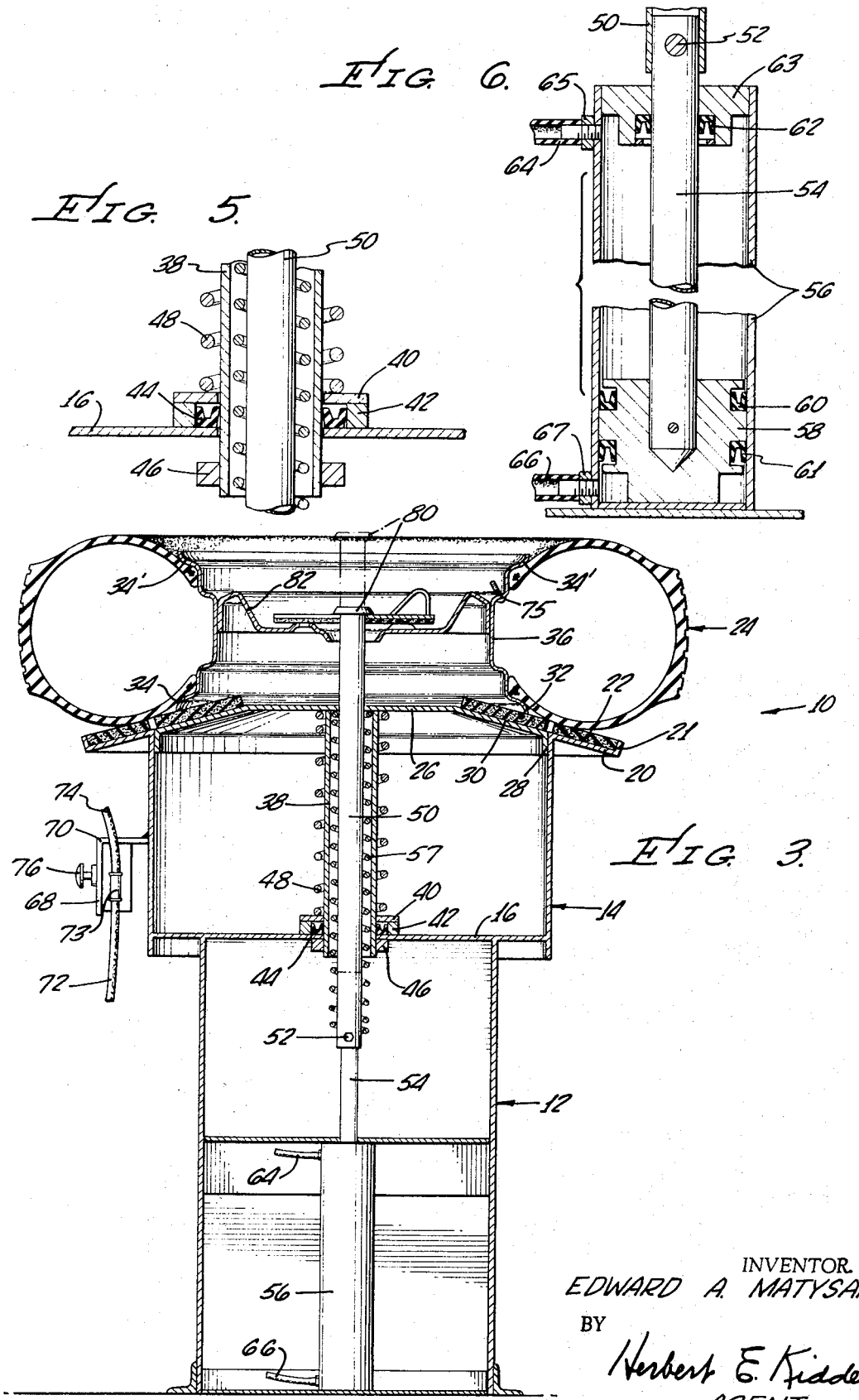

APPARATUS FOR INFLATING TUBELESS TIRES

BACKGROUND OF THE INVENTION

The present invention pertains to apparatus for inflating a tubeless tire mounted on a drop-center rim.

The initial inflation of a tubeless tire mounted on a drop-center rim has presented the industry with a serious problem in that, until the present invention, no completely satisfactory means has been found to establish the initial contact of both tire beads with their respective rim flanges. Until both tire beads are seated on their flanges, it is impossible to inflate the tire, as air entering the tire through the valve stem escapes through the gaps where sealing contact is not made. The problem is that the sidewalls of the uninflated tire normally collapse toward each other in axial direction when initially mounted on the wheel, and it is necessary to spread the beads apart axially so as to cause them to contact the axially spaced flanges.

Various attempts have been made to provide devices for squeezing the tread of the tire along its outer circumference, or otherwise causing the tire beads to bulge outwardly into sealing contact with the wheel flanges until an initial sealing inflation could be effected, but these have all had various shortcomings that made them unsatisfactory. Among these have been various devices utilizing a chamber which cooperates with the wheel flange and one side wall of the tire to form an air-tight enclosure, of which the tire is a part. When air is introduced into this enclosure, the tire is inflated sufficiently to expand both beads against their respective rim flanges in sealing contact therewith, after which the tire can be inflated to its normal pressure in the usual manner. However, such devices have had two serious shortcomings that have prevented them from achieving commercial success: (1) they require manual effort to push the Wheel downwardly with respect to the tire so as to cause the top bead of the tire to engage the top flange of the wheel; and (2) there has never been a device of the class described known to applicant, in which there was not a serious air-leakage problem in the chamber, which resulted in the loss of so much air that there was difficulty in keeping the pressure up.

SUMMARY OF THE INVENTION

The primary object of the present invention is to provide an improved apparatus for inflating tubeless tires which is convenient and easy to use, and extremely economical of the compressed air that it uses. One feature of the invention is that it is designed to be almost completely air-tight, and therefore wastes little or no compressed air.

Another object of the invention is to provide apparatus of the class described in which the wheel is pulled downwardly with respect to the tire by power actuated means, so as to effect sealing contact between the upper tire bead and its wheel flange, and the only manual operation required of the operator is loading the tire and wheel on the apparatus, and removing it therefrom after inflation has been completed.

Still another object of the invention is to provide an apparatus for inflating tubeless tires which is simple and inexpensive to manufacture, ruggedly built for long, trouble-free service life, compact, and requiring relatively low-pressure air to operate the device.

These objects are achieved by providing an open-top cylindrical chamber having a radial sealing flange around its upper edge which engages the bottom sidewall of a tire resting on the apparatus. Slidable vertically within the chamber is a piston having an annular sealing ring on its top surface that engages the bottom rim flange of the wheel. A cylindrical sleeve is fixed to the underside of the piston at its center, and the sleeve passes downwardly through an annular seal in the bottom of the chamber. A cylindrical shaft is attached at its bottom end to the actuating rod of an air cylinder, and passes upwardly through the sleeve and an aperture in the piston, and through the center of the wheel. A plate is detachably secured to the top end of the shaft and bears against the top surface of the wheel. Thus, when the air cylinder is energized, the actuating rod is retracted downwardly, pulling the wheel down with it and causing the top bead of the tire to contact the wheel rim in an air-sealing engagement. With the interior of the tire thus sealed on the top side by engagement of the upper bead with the upper wheel flange, and on the bottom side by the air chamber which is bounded on one edge by the contact line of the lower rim flange with the annular sealing ring on the piston, and on the other edge by the contact line of the lower tire sidewall with the radial sealing flange on the chamber, the tire can be inflated in the usual manner until both beads are seated against their rim flanges, and thereafter brought up to normal pressure. Air leakage from the chamber is prevented by the cylindrical sleeve on the underside of the piston which passes through the annular seal in the bottom of the chamber, and the downward pull on the wheel, which is necessary to effect sealing contact of the upper tire bead with the upper wheel flange, is accomplished by the cylindrical shaft that passes through the center of the sleeve, and which is attached at its bottom end to the actuating rod of the air cylinder.

The foregoing and other objects and advantages of the invention will become apparent to those skilled in the from the following detailed description of the preferred embodiment, with reference to the accompanying drawings.

BRIEF DESCRIPTION OF THE DRAWINGS

FIG. 3 is another view similar to FIG. 2, but showing the tire inflated to the stage where both beads are seated on their respective rim flanges;

FIG. 5 is an enlarged, fragmentary sectional view taken through the annular seal in the bottom of the chamber, through which the cylindrical sleeve passes; and FIG. 6 is an enlarged axial section through the air cylinder and piston, which are located in the base of the apparatus.

DESCRIPTION OF THE PREFERRED EMBODIMENT

Figure 2:
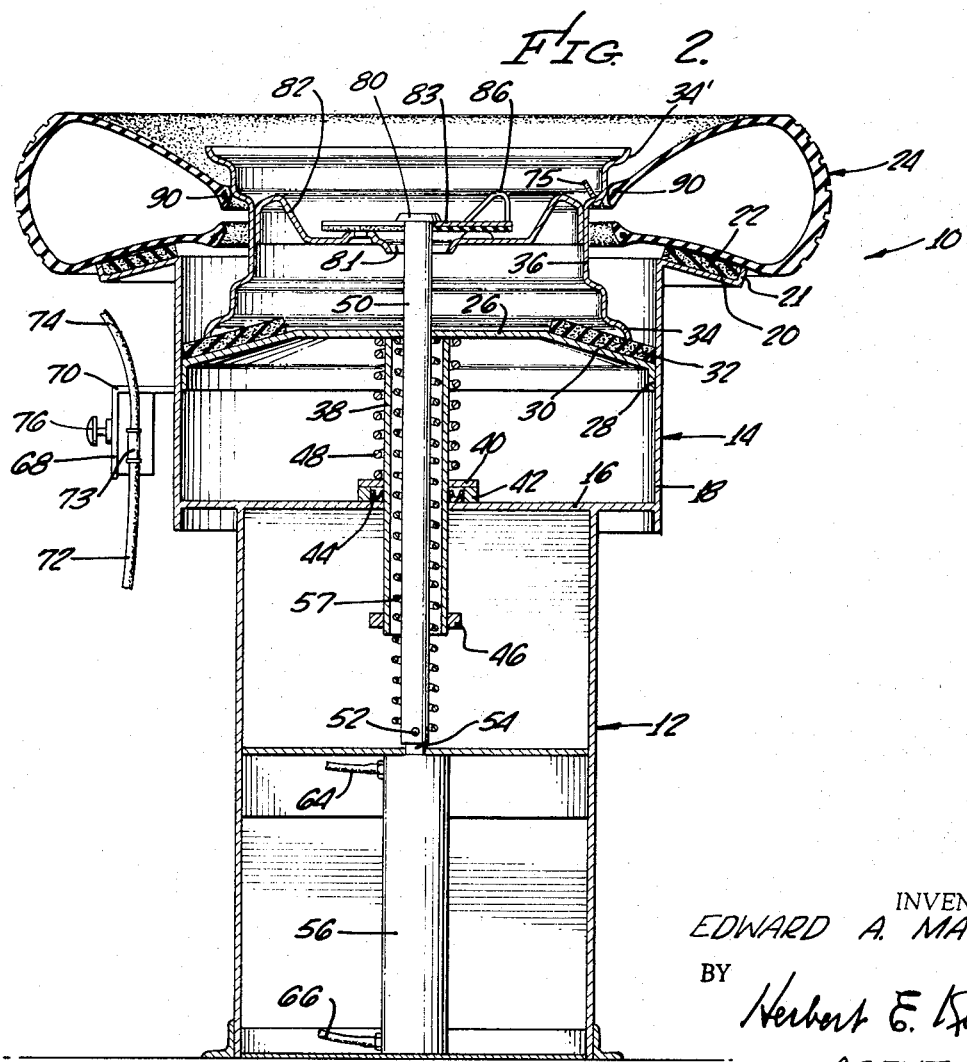
FIG. 2 is an enlarged vertical section of the same, showing a tire and wheel positioned on the apparatus with the wheel pulled downwardly by the air cylinder in the base of the machine.

In the drawings, the apparatus of the present invention is designated in its entirety by the reference numeral 10, and comprises a generally rectangular, box-like base 12, upon which a cylindrical chamber 14 is mounted. The chamber 14 is disposed with its axis extending vertically, and the bottom of the chamber comprises a circular plate 16 which is welded around the edges to the cylindrical sidewalls 18. Projecting radially outward and inclined downwardly at a slight angle from the top edge of sidewall 18 is an annular flange 20 having an upturned lip 21 around its outer edge, and cemented to the top of the flange is a ring 22 of elastomeric material, preferably sponge rubber or polyurethane foam, which serves to form an airtight seal with the sidewall of a tire 24 when the latter is resting on the ring, as shown in FIGS. 2 and 3.

Slidable vertically within the cylindrical chamber 14 is a relatively shallow piston 26 formed of steel plate and having a downwardly turned annular flange 28 on its outer periphery, which is slideable within the walls of the chamber 14, but with ample clearance so that air can leak down past this flange without any difficulty, to fill the chamber. The outer portion 30 of the piston 26 is sloped conically to the same angle as the flange 20 on the chamber 14, and cemented to the top surface of this conically sloped portion is a ring 32 of sponge rubber or polyurethane foam, which makes an airtight seal with the bottom flange 34 of the wheel rim 36, upon which tire 24 is mounted.

Welded to the underside of the piston 26 at the center thereof is a downwardly extending cylindrical sleeve 38, which projects down through a hole in the center of the chamber bottom 16 into the space enclosed by the base 12. Sleeve 38 also passes through the opening of an annular steel plate 40 which is supported around its outer edge on a ring 42, and the latter is supported, in turn, on the chamber bottom 16. Plate 40 and ring 42 form an annular housing which surrounds and encloses a sealing ring 44 that slidably engages the outer surface of sleeve 38. A limit stop ring 46 is bolted to the bottom end of sleeve 38 and engages the underside of chamber bottom 16 when the piston 26 is at the upper limit of its travel, as shown in FIG. 3. Surrounding the sleeve 38 is a helical compression spring 48, the bottom end of which bears against plate 40, and the top end bears against the underside of piston 26. Spring 48 urges the piston 26 upwardly to the position shown in FIG. 3, and yields to allow the piston to move downwardly within the chamber, as in FIG. 2.

Slidable vertically within a hole in the center of piston 26 is a cylindrical tube 50. Tube 50 extends downwardly through the center of sleeve 38 and at its bottom end is secured by a pin 52 at the top end of the piston rod 54 of an air cylinder 56. Tube 50 thus serves as an extension for piston rod 54, and the two move as one. Surrounding the tube is a helical compression spring 57, the top end of which extends up into sleeve 38 and abuts against the underside of the piston 26. The bottom end of spring 57 bears against pin 52 and exerts a downward thrust against the piston rod and extension 54, 50, tending to push the same downwardly with respect to the piston 26. At the same time, an equal upward thrust is exerted by spring 57 against piston 26, augmenting the upward thrust of spring 48.

Air cylinder 56 is of the double-acting type, and has a piston 58 (FIG. 6) with two axially-spaced, annular grooves, in which oppositely facing sealing rings 60 and 61 are seated. Top ring 60 prevents air from escaping downwardly past the piston, while bottom ring 61 prevents the escape of air upwardly. Piston rod 54 also passes through a sealing ring 62 in the top end 63 of the cylinder, which prevents the escape of air through the clearance between rod 54 and the cylinder top. Air under pressure is supplied to the top end of the cylinder through a flexible air line 64, which is connected to the cylinder by a fitting 65. The bottom end of the cylinder is supplied with air under pressure by a flexible air line 66, which is connected to the cylinder by a fitting 67. The two air lines 64 and 66 go to a control valve housing 68 mounted on a bracket 70 on the outside of chamber 14. Valve housing 68 is supplied with pressurized air by an air supply line 72, which is connected to a source of high-pressure air. Line 72 is connected to one branch of a T-fitting 73 projecting from the side of housing 68, and another air hose 74 is connected to the other branch. Hose 74 has the usual air chuck (not shown) on its other end, by means of which the tire 24 is inflated through valve 75 on the wheel rim 36.

Figure 1:
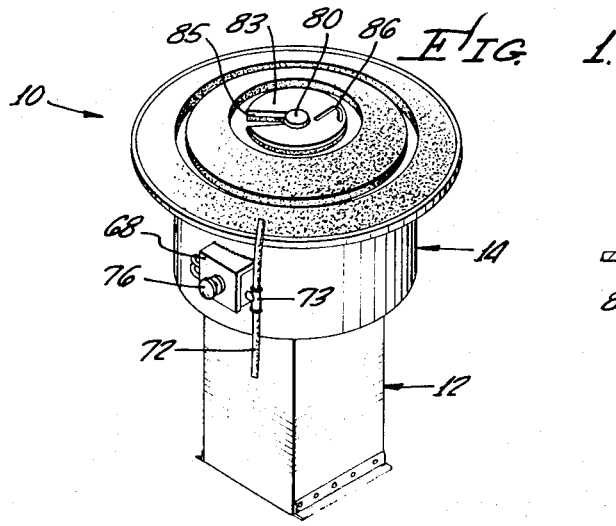
FIG. 1 is a perspective view of a tubeless tire inflating apparatus embodying the principles of the invention.
Figure 4:
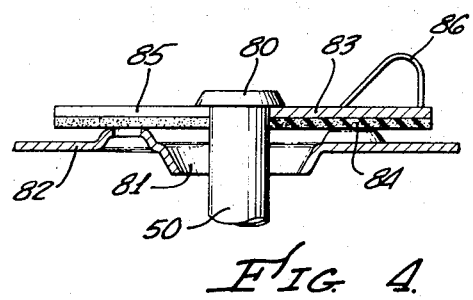
FIG. 4 is a further enlarged, fragmentary sectional view, showing the plate detachably mounted on the top end of the cylindrical shaft, and the manner in which the plate bears against the top surface of the wheel.

The valve mechanism in housing 68 is actuated by a spring-loaded control button 76 from the front side of the housing. In the normal, extended position of the control button 76, the valve sends air pressure through hose 64 to the top end of the air cylinder 56, causing the piston rod 54 to be retracted. Welded to the top end of the tube 50 is a circular disk 80 of somewhat larger diameter than the outside diameter of the tube, so that the outer edge of the disk projects radially beyond the tube. The tube 50 extends upwardly through the central opening 81 in the wheel 82, and inserted between the overhanging lip of disk 80 and the top surface of the wheel 82 is a keeper plate 83. Keeper plate 83 has a pad 84 of soft rubber cemented to its underside, and the pad rests on the lug bolt bosses of the wheel, as best seen in FIG. 4. The keeper plate 83 has a wedge-shaped opening 85 cut into one side thereof and extending all the way in to the center of the plate, where the width of the opening is substantially the same as the outside diameter of the tube. 50. The disk 80 thus overhangs the keeper plate 83 and bears against the top surface of the same, so that when the piston rod 54 is pulled downwardly by the air cylinder 56, the wheel 82 is pulled downwardly with it by the keeper plate 83. Plate 83 can be inserted between the disk 80 and wheel 82 by sliding it horizontally, with the opening 85 positioned to receive the tube 50. In order to insert the plate between the disk 80 and wheel 82, it is necessary to extend the piston rod 54 by pressing inwardly on the control button 76, which causes the valve to send air pressure through line 66 to the bottom end of the cylinder 56, while the top end is vented to the atmosphere. Air pressure in the bottom end of the cylinder forces piston 58 upwardly, raising the tube 50 so that disk 80 clears the top of the wheel. Plate 83 has a handle 86 fixed to its top side near the edge opposite the opening 85, which facilitates handling of the plate.

In addition to its function of pulling the wheel 82 downwardly when air pressure is admitted to the top end of cylinder 56, the keeper plate 83 and air cylinder also provide a safety feature by virtue of the positive restraint exerted on the wheel during the inflation process, in the event that the air pressure suddenly becomes too great. In certain prior tire inflaters, it is possible for the wheel rim to blow out of the tire with great force, and there have been a number of fatal accidents of this kind. Such accidents are impossible with the present invention, as the wheel is positively held by the keeper plate 83 against being hurdled upwardly by the piston 26.

The operation of the invention is as follows: With the keeper plate 83 removed from under the disk 80, an uninflated tire 24 mounted on a wheel 82 is placed on top of the apparatus 10, with the bottom sidewall of the tire resting on the outer sealing ring 22 of the chamber 14, and the bottom rim flange 34 of the wheel resting on the inner sealing ring 32 of the piston 26. Valve control button 76 is pressed inwardly, causing tube 50 to rise through the central aperture of the wheel, until the disk 80 is well above the lug bolt bosses of the wheel. Keeper plate 83 is then inserted under the disk 80. When button 76 is released, air pressure is admitted to the top of cylinder 56, causing the tube 50 to be pulled downwardly, and the wheel 82 with it. As the piston reaches the bottom of its stroke, the relative positions of the several parts are as shown in FIG. 2. It will be noted that the bottom sidewall of the tire is pressed tightly against sealing ring 22; and bottom rim flange 34 is pressed tightly against sealing ring 32. The downward pull on wheel 82 by tube 50 has the effect of pushing the tire upwardly with respect to the wheel, and the upper bead 90 of the tire is therefore forced up onto the upper portion of the wheel rim, as shown in FIG. 2. This contact of upper bead 90 against the wheel rim provides an air seal at this point, thereby forming an airtight enclosure which includes the inside of the tire and the inside of chamber 14 below the piston 26. As mentioned earlier, the downwardly turned flange 28 has sufficient clearance between it and the chamber sidewall 18, so that air can leak around the flange into the chamber 14 as fast as it is supplied to the tire. The sliding sleeve 38 is sealed by ring seal 44 where it passes through the bottom 16 of the chamber. Thus, when air is introduced into the tube through the valve 75 using the air chuck on the end of hose 74, the pressure builds up, both within the tire and within chamber 14, due to leakage of air past flange 28. As the tire becomes partially inflated, the pressure of the air against the side walls causes the top bead of the tire to force itself up against the upper rim flange 34'; and at the same time, air pressure acting against the underside of piston 26 causes the latter to be forced upwardly against the resistance of the air cylinder 56, until the piston reaches the top of its stroke. At this point, the position of the several parts of the apparatus is as shown in FIG. 3. With both beads now tightly sealed against their respective rim flanges, the tire is airtight, and inflation can be continued until the desired pressure is reached. To remove the tire, valve control button 76 is depressed, raising the tube 50 so as to release pressure of the disk 80 against keeper plate 83, and the latter is removed. The tire and wheel can then be removed from the apparatus.

While I have shown and described in considerable detail what I believe to be the preferred form of my invention, it will be understood by those skilled in the art that various changes may be made without departing from the broad scope of the following claims.

I claim:

1. Apparatus for inflating a tubeless tire mounted on a wheel having rim flanges against which the tire beads seat when inflated, said apparatus comprising:
   a cylindrical chamber mounted with its axis perpendicular to the ground, said chamber having a closed bottom, an open top, and radial flanges around its top perimeter;
   first sealing means on said flange engageable with the bottom sidewall of a tire resting on the apparatus so as to provide an airtight seal at this point;
   a piston slidable within said chamber;
   second sealing means on the top surface of said piston adjacent the outer edge thereof, said second sealing means being engageable by the lower rim flange of said wheel to provide an airtight seal at this point;
   a cylindrical sleeve fixed to the underside of said piston in an airtight junction therewith, passing downwardly through an opening in the bottom of said chamber;
   third sealing means surrounding said sleeve at the point where it passes through said opening, so as to provide an airtight seal at this point;
   an air cylinder mounted below said chamber with its piston rod longitudinal axis coaxial with the axis of said chamber, said air cylinder having a piston, a piston rod, and an extension therefor passing upwardly through said sleeve and through an aperture in said first-named position, and through the central opening of said wheel;
   a keeper detachably connected to the top end of said piston rod extension, said keeper bearing against the top of said wheel;
   manually controllable valve means operable to admit high pressure air to the bottom end of said air cylinder when the valve is actuated, so as to extend said piston rod and its extension;
   said valve means normally admitting pressure air from a source to the top end of said cylinder when the valve is not being manually actuated, so as to retract said piston rod and its extension, the downward pull of said piston rod extension and keeper against said wheel causing said bottom sidewall of the tire to press tightly against said first sealing means, and the lower rim flange of the wheel to press tightly against said second sealing means, and the upper tire bead to press tightly against the upper portion of the wheel rim; and
   means for admitting pressure air from said source into the interior of said tire and into said chamber below said second sealing means, said air being confined by said first, second and third sealing means so that the pressure builds up rapidly within the tire and chamber, the air pressure within said chamber acting against the underside of said first-named piston to push the latter upwardly against the resistance of said air cylinder;
   the area of said first-named piston being substantiallu greater than the area of said air-cylinder piston, so that the total force exerted against said first-named piston is greater than the opposing force exerted by the air-cylinder piston, causing said first piston to move upwardly to its upper extreme position against the resistance of the air cylinder piston.

2. The apparatus of claim 1, which further includes a compression spring surrounding said cylindrical sleeve and exerting an upward thrust against said first-named piston, the bottom end of said spring being supported by the bottom of said chamber.

3. The apparatus of claim 2, which further includes a second compression spring surrounding said piston rod extension and extending up into said cylindrical sleeve, the upper end of said second spring bearing against the underside of said first piston, and the lower end thereof being attached to said piston rod extension.

* * * * *